US012809748B2

(12) United States Patent
Shpilyuck et al.

(10) Patent No.: US 12,809,748 B2
(45) Date of Patent: Nov. 24, 2026

(54) CHAOS TESTING PRIORITIZATION USING RUNTIME METRICS

(71) Applicant: Dell Products, L.P., Round Rock, TX (US)

(72) Inventors: Boris Shpilyuck, Ashdod (IL); Nisan Haimov, Beer-Sheva (IL); Igor Dubrovsky, Beer-Sheva (IL); Parmeshwr Prasad, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 205 days.

(21) Appl. No.: 19/013,720

(22) Filed: Jan. 8, 2025

(65) Prior Publication Data

US 2026/0195237 A1 Jul. 9, 2026

(51) Int. Cl.

| | |
|---|---|
| ***G05D 1/00*** | (2024.01) |
| ***B64F 5/60*** | (2017.01) |
| ***G05B 13/02*** | (2006.01) |
| ***G05D 1/617*** | (2024.01) |
| ***G05D 101/10*** | (2024.01) |
| ***G05D 101/15*** | (2024.01) |
| ***G06F 11/3604*** | (2025.01) |
| ***G06F 30/15*** | (2020.01) |
| ***G06F 30/27*** | (2020.01) |

(Continued)

(52) U.S. Cl.
CPC ................................ *G06F 11/3612* (2013.01)

(58) Field of Classification Search
CPC ......................... G06F 11/3612; G06F 2201/81
See application file for complete search history.

(56) References Cited

U.S. PATENT DOCUMENTS 11,321,217 B1 * 5/2022 Agarwal ............... G06F 11/302
2011/0191138 A1 * 8/2011 Saraf .................. G06Q 10/0635
706/54

(Continued)

OTHER PUBLICATIONS

Shetty. Minimizing Blast Radius of Chaos Engineering Experiments via Steady-State Metrics Forecasting. Aalto University. 2023 (Year: 2023).*

(Continued)

*Primary Examiner* — Lewis A Bullock, Jr.
*Assistant Examiner* — Amir Elsayed Darwish
(74) *Attorney, Agent, or Firm* — Amin, Turocy & Watson, LLP

(57) ABSTRACT

Architectures and techniques are described for efficiently selecting microservices for chaos testing by determining those most at risk of violating performance thresholds. A device having at least one processor receives performance threshold data for multiple microservices, each threshold corresponding to a runtime metric (e.g., CPU usage, memory utilization, network throughput) monitored by a microservices platform. The device further obtains actual runtime metric data gathered during normal operation of the microservices. Based on the threshold data and runtime metric data, the device calculates, for each microservice, a maximal relative deviation (MRD), which identifies the threshold most likely to be violated. The device can then transmit the MRD values to a chaos testing service, which uses the MRD values to focus chaos testing on those microservices having MRD values exceeding a defined criterion and can further recommend types of scenario testing.

20 Claims, 11 Drawing Sheets

(51) Int. Cl.

| | |
|---|---|
| ***G06N 3/04*** | (2023.01) |
| ***G06N 3/044*** | (2023.01) |
| ***G06N 3/08*** | (2023.01) |

(56) References Cited

U.S. PATENT DOCUMENTS

| | | | | |
|---|---|---|---|---|
| 2018/0248771 | A1* | 8/2018 | Côté | H04L 41/0894 |
| 2019/0102717 | A1* | 4/2019 | Wu | G06Q 10/06375 |
| 2022/0141304 | A1* | 5/2022 | Gefen | G06F 11/323<br>709/219 |
| 2022/0342662 | A1* | 10/2022 | Fox | B60W 50/02 |
| 2024/0045793 | A1* | 2/2024 | Padala | G06F 11/3414 |
| 2024/0169121 | A1* | 5/2024 | Abu El Ata | G06F 30/20 |
| 2024/0248830 | A1* | 7/2024 | Shpilyuck | G06F 11/3006 |
| 2024/0411542 | A1* | 12/2024 | Goyal | G06F 8/433 |
| 2025/0053501 | A1* | 2/2025 | Ayyadurai | G06F 11/0793 |

OTHER PUBLICATIONS

Ramaswamy. Resilience Engineering in DevOps: Fault Injection and Chaos Testing for Distributed Systems. doi: 10.48047/nq.2020.18.12.NQ20269. Dec. 2020 (Year: 2020).*

Vankayala. Tail-Latency-Oriented Quality Assurance for Microservices: A System-Aware, SLO-Driven Approach. IJSET SSN (Online): 2348-4098. 2022. (Year: 2022).*

Kesim et al. Identifying and Prioritizing Chaos Experiments by Using Established Risk Analysis Techniques. DOI 10.1109/ISSRE5003.2020.00030. (Year: 2020).*

Camilli et al. Microservices Integrated Performance and Reliability Testing. DOI:10.1145/3524481.3527233. May 2022. (Year: 2022).*

* cited by examiner

CHAOS TESTING PRIORITIZATION USING RUNTIME METRICS

BACKGROUND

Chaos testing refers to the discipline of experimenting on a software system in order to build confidence in the system's capability to withstand turbulent and unexpected conditions. Generally, chaos testing intentionally creates continuous, random or systematic failures in the software system, for instance, such as terminating a service instance frequently relied on by the software system, throttling the traffic to or from a particular service, or the like. Hence, chaos testing can effectively test the ability of said system to overcome such failures. After failure injection resulting from the chaos testing, the software system can be analyzed in order to understand the impact the chaos testing (e.g., intentional failures) had on the system.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
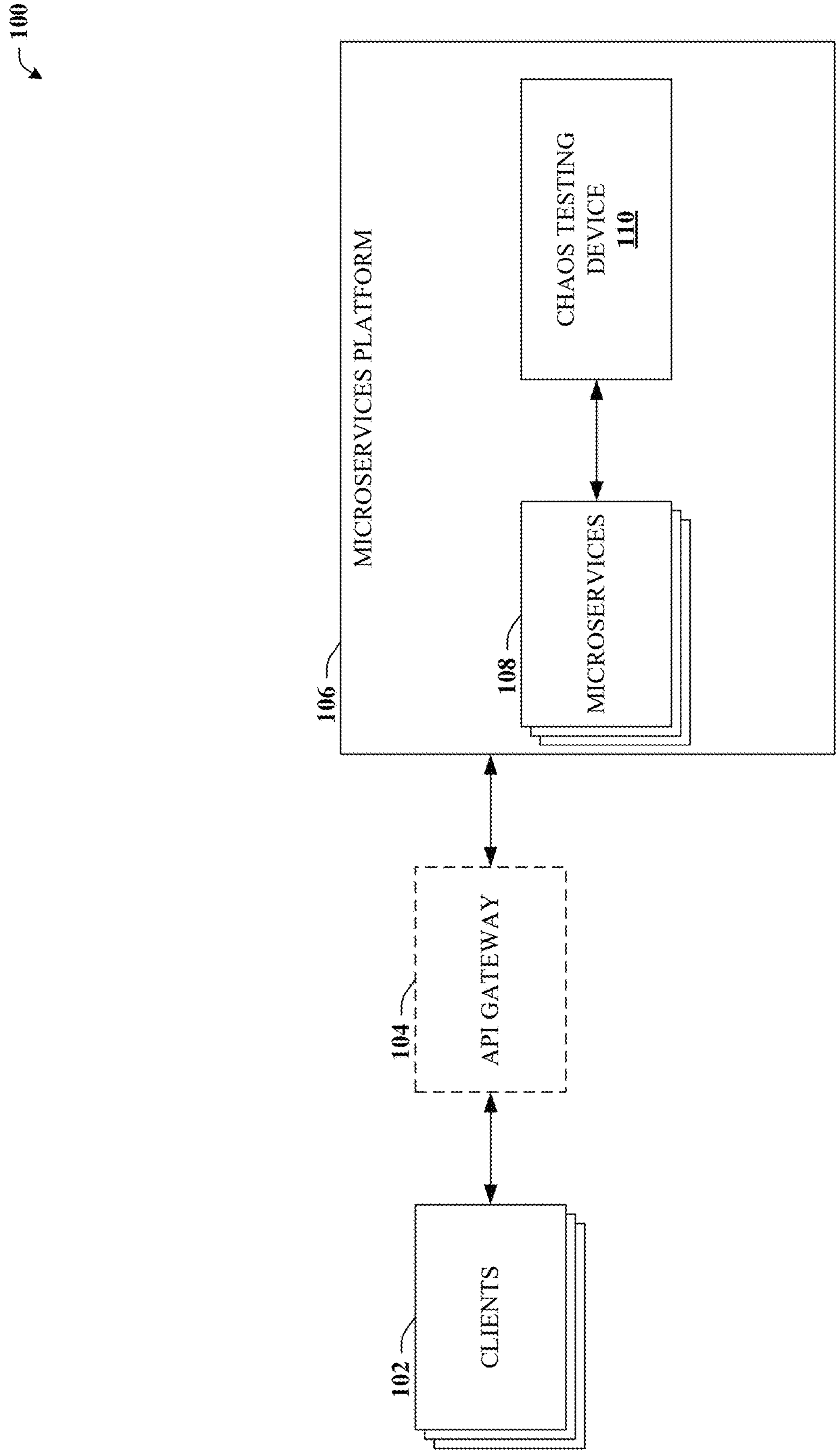
FIG. 1 depicts a schematic block diagram 100 illustrating certain functionality or operation of a microservices platform in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As noted in the Background section, chaos testing results can be analyzed in order to understand how the system responds to undesirable events such as certain components going down or certain resources becoming over utilized. Such analysis is a complex and time-consuming process, so a practical solution for chaos testing is to inject the failures into the subset of the most critical portions of the software system.

It is to be understood that chaos testing can be utilized for any type of software system, but as a representative example used for the remainder of this disclosure, chaos testing and other related elements are described in the context of a microservices platform, an example of which is illustrated in connection with FIG. 1. In other words, while microservices are used herein as a representative example, the disclosed techniques can be applied to any type of executable instruction unit such as a microservice, a module, an application, a software component, or a computational process.

A microservices platform can represent a software architecture and set of tools designed to support the development, deployment, and management of microservices-based applications. Microservices architecture(s) generally enable an approach to software development where applications are composed of loosely coupled, independently deployable services, each responsible for a specific business function. Microservices platforms can provide developers with the tools and infrastructure needed to build, deploy, and operate microservices-based applications at scale. The platform can help organizations embrace the principles of microservices architecture and leverage associated benefits, such as agility, scalability, and resilience, to deliver innovative and reliable software solutions.

To provide additional context, consider an example architecture associated with a microservices platform, illustrated in connection with FIG. 1. FIG. 1 depicts a schematic block diagram 100 illustrating certain functionality or operation of a microservices platform in accordance with certain embodiments of this disclosure.

Microservices platform 106 can have deployed thereon microservices 108. Microservices 108 can communicate with one another via well-defined application programming interfaces (APIs), such as representational state transfer (REST) APIs, also referred to as RESTful APIs. Each microservice 108 can represent a loosely coupled, independently deployable, self-contained service that serves a specific function or capability. Microservices 108 can differ from traditional monolithic applications due to this architectural design. For example, an application can make API calls to one or more microservices 108 instead of coding the function or capability into the application in a monolithic way. Hence, a given microservice 108 can provide a dedicated function or capability to many different applications or other microservices 108 in a more resilient and scalable manner.

For example, clients 102 that execute applications can make calls to microservices 108 of microservices platform 106. Optionally, any such communication can be via API gateway 104. API gateway 104 can be a server that acts as a single entry point for clients 102 to access multiple microservices 108. API gateway 104 can serve as a reverse proxy that routes requests from clients 102 to the appropriate microservices 108, abstracting away potential complexities of the underlying microservices architecture.

It is appreciated that in the context of this disclosure, microservices platform 106 can be any suitable platform that provides access to microservices 108. Such can be any suitable cloud-based services platform, a containerized workflow platform or container orchestration platform such as Kubernetes or another system or platform.

As indicated above, microservices platforms (e.g., microservices platform 106) can provide developers with the tools and infrastructure needed to build, deploy, and operate microservices-based applications at scale. In order to meet these goals, it can be important to monitor the health of microservices platform 106 as well as the operation of the microservices 108 deployed thereon, which can be provided at least in part by chaos testing device 110.

As explained, chaos testing device 110 can intentionally inject issues into microservices platform 106 in order to test how the system responds. After failure injection, the system can be analyzed in order to understand the impact the failure had on the system. However, in a typical microservices environment (e.g., microservices platform 106), the application might consist of hundreds or even thousands of the microservices 108. Because chaos testing relies on system resources it is not generally practical to do chaos testing for all microservices 108 that are deployed on microservices platform 106.

Rather, a more realistic approach is to apply chaos testing techniques to only a subset of microservices 108. Therefore, it becomes very challenging to decide on the subset of the most critical microservices (e.g., system stability-wise) that should undergo the chaos testing. In accordance with some embodiments of the disclosed techniques, the subset of microservices 108 selected to undergo chaos testing can be determined by identifying one or more microservices 108 that operate at runtime at or near performance thresholds. To these and other related ends, a maximal relative deviation (MRD) factor can be determined by a thresholds and metrics device.

For example, the thresholds and metrics device can examine runtime metrics of each microservice 108 on microservices platform 106 and compare those runtime metrics to associated performance thresholds with regard to resources of microservices platform 106 (e.g., memory utilization, processing utilization, network resource utilization, . . . ). However, a given microservice 108 can operate well within performance threshold during some periods, but not during other periods, so adequate testing can be problematic in some cases. To that end, the MRD factor can be employed to identify microservices 108 that deviate significantly from an average value for that particular threshold and/or metric.

Furthermore, in addition to identifying microservices 108 having a high MRD factor, the disclosed techniques can further intelligently recommend a specific type or scenario to be used in connection with chaos testing. For example, if a particular microservice 108 has a very high MRD with regard to a first performance threshold (e.g., memory utilization), but a very low MRD with regard to a second performance threshold (e.g., network utilization), then it may not be a good use of system resources to subject that microservice 108 to chaos testing that relates to throttling network resources. On the other hand, chaos testing scenarios that relate to memory utilization testing may be much more salient, since memory utilization would appear to be the most likely failure point for that particular microservice 108, which is further detailed in connection with FIG. 2 and subsequent drawings.

It is to be appreciated that while chaos testing can be highly desired for identifying weaknesses and vulnerabilities in software platforms or systems, allocating excessive resources to chaos testing can affect resources, budgets and manpower. Therefore, there is a need for an approach that allows software platform providers to balance between those concerns. The disclosed techniques can be used to direct chaos testing in a more efficient manner. For example, by being able to perform chaos testing on the most vulnerable parts of the system as determined in this disclosure can provide a reasonable confidence in the resiliency of the system, while dedicating no more than a reasonable amount of resources for the chaos testing process.

Example Systems

Figure 2:
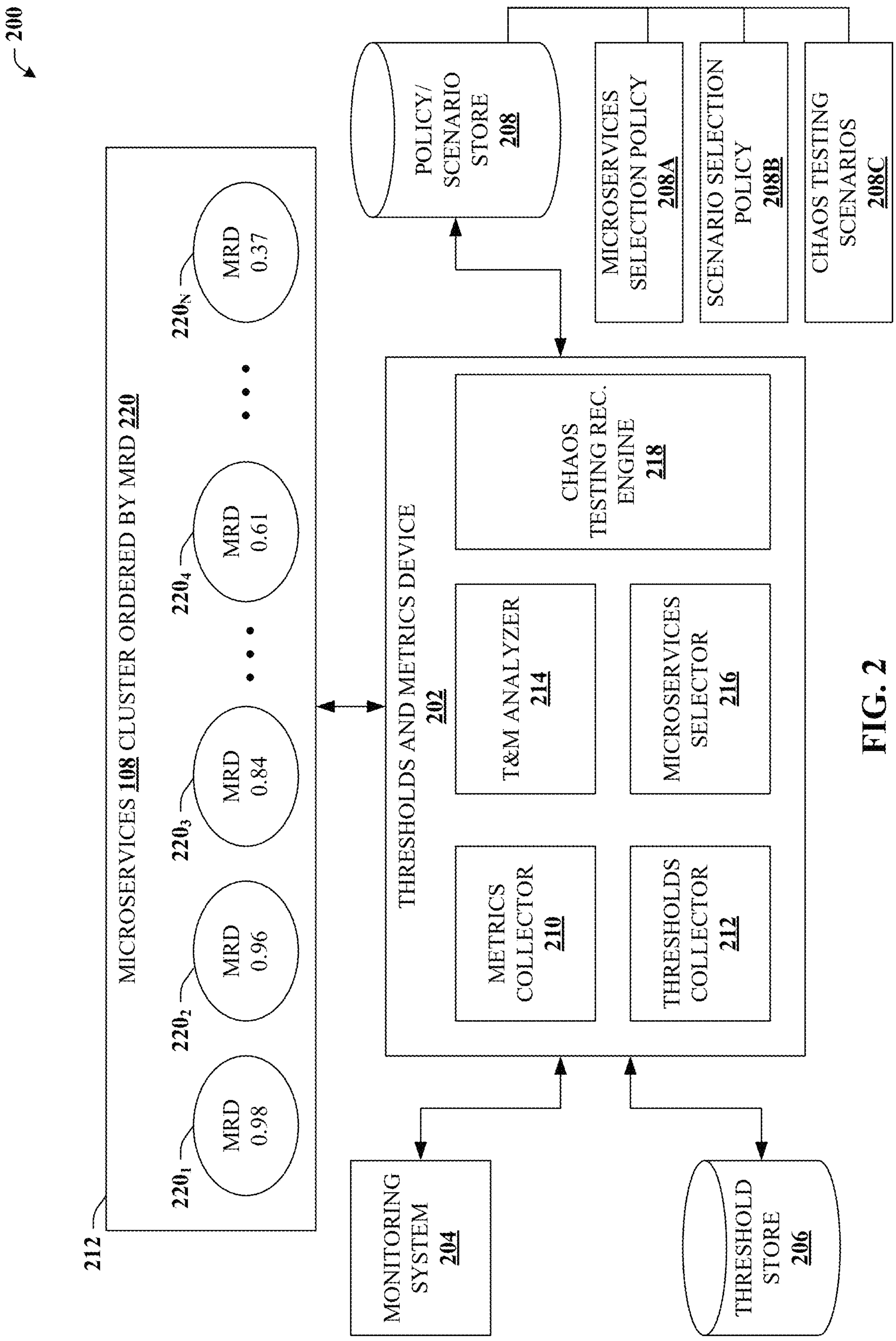
FIG. 2 depicts a schematic block diagram illustrating a thresholds and metrics device that can determine a maximal relative deviation (MRD) for microservices of a microservices platform in accordance with certain embodiments of this disclosure.

Referring now to FIG. 2, a schematic block diagram 200 is depicted illustrating thresholds and metrics device 202 that can determine a maximal relative deviation (MRD) for microservices 108 of a microservices platform 106 in accordance with certain embodiments of this disclosure.

TM device 202 can be coupled to or comprise any of monitoring system 204, threshold store 206, policy/scenario store 208, or other suitable elements. Hence, thresholds and metrics device 202 can be configured to receive and process data from a monitoring system 204, a threshold store 206, and a policy/scenario store 208. Thresholds and metrics device 202 can leverage this incoming information to evaluate microservices 108 with respect to their defined performance limits, and to determine the appropriate chaos testing scenarios to be executed.

The monitoring system 204 can continuously gather runtime metrics for a plurality of microservices 108 in the distributed environment. These metrics may include, for example, CPU consumption, memory usage, and network bandwidth utilization, among others. In some embodiments, the monitoring system 204 comprises software agents or external collectors that observe microservice performance in real time and forward pertinent data to the thresholds and metrics device 202. Alternatively, the monitoring system 204 may draw upon one or more existing third-party platforms (e.g., Prometheus™, New Relic™, or DataDog™), thus eliminating the need to implement a custom monitoring tool. Regardless of the specific implementation, data from the monitoring system 204 can be periodically or continuously transmitted to the thresholds and metrics device 202 for further processing.

The threshold store 206 can house the defined operational and performance boundaries for each microservice. These thresholds may include maximum CPU usage, memory footprint limits, network throughput boundaries, or custom application-level constraints (e.g., maximum allowable response times). Each entry in the threshold store 206 correlates a microservice identifier with one or more threshold parameters (e.g., threshold name, threshold value, relevant metric identifier). This data structure may take the form of a configuration file, database table, or other suitable record that is accessible to the thresholds and metrics device 202. By retrieving threshold information from the threshold store 206, the thresholds and metrics device 202 is able to determine how close or far each microservice is from violating an associated threshold.

The policy/scenario store 208 can comprise a library of potential chaos testing scenarios 208C that can be recommended or applied to the various microservices 108. These scenarios 208C may include, for example, simulated service instance termination, network throttling, central processing unit (CPU) stress tests, or memory leak simulations. In some embodiments, the policy/scenario store 208 further includes one or more microservices selection policies 208A. Microservices selection policies 208A can be defined by system operators or another suitable entity. Microservices selection policies 208A can specify the microservices 108 to choose for chaos testing (e.g., which microservices 108 or the number of microservices 108) based on the microservices' deviations from thresholds. For instance, if a microservice's network throughput metric is nearing its upper threshold, the policy/scenario store 208 might suggest network degradation or connection drop scenarios, while ignoring CPU-related scenarios when CPU consumption is well within established limits. Microservices selection policy 208A can select, e.g., the top 10% of microservices 108 having the highest MRD 220, some X number of microservices 108 having the highest MRD 220, all microservices 108 having an MRD 220 above a defined threshold, and so on. It is understood that MRDs 220 could be calculated in a different manner such that a lower MRD 220 is to be used as a selection criterion and any such permutation relating to specific calculations or results of MRD 220 are considered to be within the scope of this disclosure.

Policy/scenario store 208 can further comprise scenario selection policy 208B. Scenario selection policy 208B can be configured to enable the thresholds and metrics device 202 to systematically determine which chaos testing scenarios to apply based on observed performance metrics. The scenario selection policy 208B can encapsulate various rules or heuristics such as focusing only on certain high-severity thresholds (e.g., CPU or memory) that have consistently approached or exceeded their predefined limits. By referencing this policy 208B, the thresholds and metrics device 202 is able to filter the available chaos testing scenarios in the policy/scenario store 208, ensuring that each microservice 108 is subjected to the tests most pertinent to its specific risk profile (for instance, injecting network latency if the microservice is near its network throughput threshold). This targeted approach conserves resources by reducing extraneous testing and directs testing efforts to areas where they are most likely to reveal system vulnerabilities.

The thresholds and metrics device 202 can dynamically integrate data from the monitoring system 204, threshold store 206, and policy/scenario store 208 to identify which microservices 108 most urgently require chaos testing and to recommend the most relevant scenarios. In that regard, thresholds and metrics device 202 can be configured to manage data from a monitoring system 204, a threshold store 206, and a policy/scenario store 208, as well as to produce key outputs that facilitate a targeted chaos testing process. In some embodiments, the thresholds and metrics device 202 includes a set of internal components for data collection, analysis, selection, and recommendation: a metrics collector 210, a thresholds collector 212, a thresholds and metrics (T&M) analyzer 214, a microservices selector 216, and a chaos testing recommendation engine 218.

The metrics collector 210 can be responsible for retrieving or receiving runtime metrics from the monitoring system 204. The monitoring system 204 may include one or more agents, third-party tools, or other data sources that track performance indicators for a plurality of microservices (e.g., CPU usage, memory consumption, and network throughput). The metrics collector 210 can collect these performance metrics at scheduled intervals (or on-demand) and can store them in a temporary or long-term data structure within the thresholds and metrics device 202. For instance, the metrics collector 210 may periodically acquire the last 24 hours' worth of CPU usage data for a given microservice 108, or continuously stream network usage data to update a metrics database in near real time.

In some embodiments, the metrics collector 210 is configured to handle custom metrics of interest to a system operator, such as response times for a particular API or error rates for a given service call. The metrics collector 210 aligns these metrics with corresponding microservice identifiers so that subsequent components within the thresholds and metrics device 202 can access the data effectively.

The thresholds collector 212 retrieves threshold specifications for each microservice 108 from the threshold store 206. These thresholds correspond to operational or performance limits, such as maximum memory usage, allowed CPU consumption, network bandwidth constraints, or custom application-level requirements (e.g., maximum permissible response latency). Each threshold is associated with at least one metric, so the thresholds collector 212 ensures that thresholds and their linked metrics can be related directly to the data gathered by the metrics collector 210.

The thresholds collector 212 may access a database or configuration files within the threshold store 206, identifying threshold values in various formats and mapping those values to the corresponding microservice names or identifiers. Once retrieved, the thresholds collector 212 consolidates the thresholds into an internal data representation that is used by the T&M analyzer 214 to detect any potential or imminent threshold violations.

The thresholds and metrics (T&M) analyzer 214 can process the data collected by both the metrics collector 210 and the thresholds collector 212 to evaluate how closely each microservice is operating relative to its thresholds. Specifically, the T&M analyzer 214 can compute a relative deviation for each threshold-metric pair, which is further detailed in connection with FIG. 3. The relative deviation metric quantifies how close the average (or some other measure, such as peak or percentile) of the observed runtime metric is to the corresponding threshold. In some embodiments, the T&M analyzer 214 calculates an MRD 220 for each microservice 108 by identifying the highest of the relative deviations across all thresholds associated with that microservice.

After determining the MRD 220, the T&M analyzer 214 can order the microservices 108 by their MRD 220 values, placing those that most closely approach their thresholds (e.g., where the MRD 220 is highest) at the top of the list. This ranking can be stored internally and shared with other components of the thresholds and metrics device 202. By quantifying each microservice's 108 risk of threshold violation, the T&M analyzer 214 enables efficient prioritization for chaos testing and other targeted reliability efforts.

The microservices selector 216 can utilize the ordered list of microservices generated by the T&M analyzer 214 to pick a subset of microservices 108 for chaos testing, illustrated here via microservices 108 being ordered according to MRD 2201-220N. This selection can be guided by a microservices selection policy 208A, which may be configured via inputs from the policy/scenario store 208 or directly by a system operator. For example, the microservices selector 216 may select the top 5% of microservices based on their MRD 220 values, or it may choose all microservices with an MRD 220 exceeding a specified threshold (e.g., 0.95).

Once the microservices selector 216 applies the microservices selection policy 208A, a final list of microservices 108 can be produced indicating the particular subset of microservices 108 that exhibit higher risks of reaching or exceeding their operational limits. This list can then be passed along to the chaos testing recommendation engine 218, and may also be exposed to external systems or logging mechanisms. By focusing on a manageable subset of microservices 108 for testing, the microservices selector 216 conserves resources while ensuring that attention is directed to the most vulnerable portions of the system.

The chaos testing recommendation engine 218 can leverage both the selected microservices 108 from the microservices selector 216 and their respective metrics/thresholds data from the T&M analyzer 214 to determine which chaos testing scenarios should be executed. In particular, the recommendation engine 218 consults scenario selection rules, potentially defined in the scenario selection policy 208B, stored within the policy/scenario store 208, to identify which chaos experiments best address the specific areas in which each microservice is nearing its threshold limits.

For instance, if a selected microservice 108 exhibits a high deviation (e.g., MRD 220) for memory consumption but a low deviation for CPU usage, the chaos testing recommendation engine 218 might suggest a memory-related chaos scenario (e.g., memory leak simulation) while omitting CPU-related scenarios from the testing plan. Similarly, if a microservice's 108 most pressing limitation involves network throughput, the recommendation engine 218 may propose network throttling or connection disruption tests. By tailoring the recommended chaos scenarios to each microservice's unique risk profile, the recommendation engine 218 helps the system operator (or an automated chaos testing orchestration tool) focus efforts where they are most likely to detect and remedy potential failures.

In this manner, the thresholds and metrics device 202, with its metrics collector 210, thresholds collector 212, T&M analyzer 214, microservices selector 216, and chaos testing recommendation engine 218, forms a cohesive system for intelligently prioritizing and recommending chaos testing in a microservices-based environment or any software system environment to which the disclosed techniques can be applied. By ranking services according to risk, selecting only the microservices with critical performance concerns, and then matching each service to the most relevant chaos scenarios, the overall testing process is streamlined and more likely to uncover significant issues before they escalate into production incidents.

Figure 3:
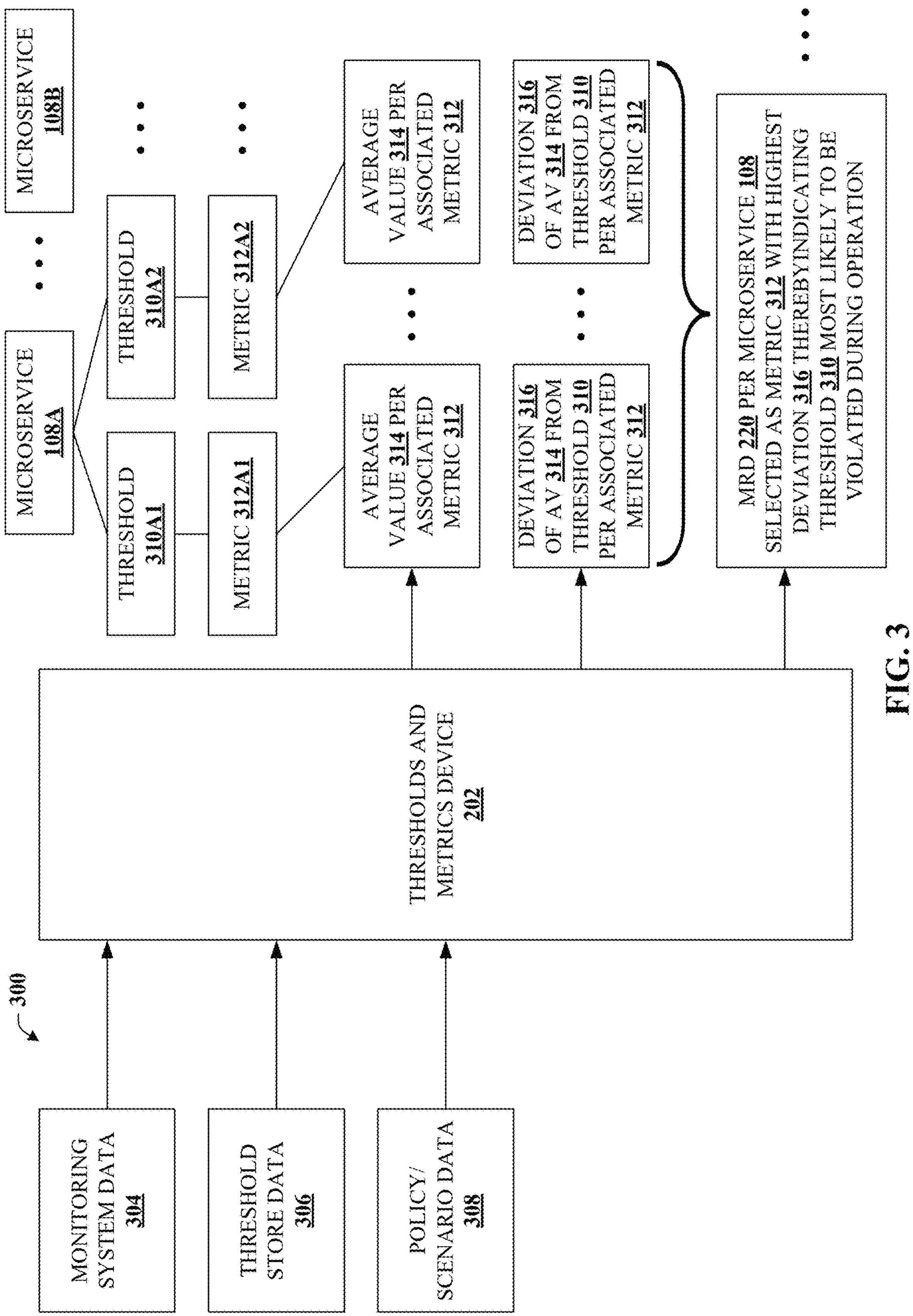
FIG. 3 depicts an example schematic block diagram illustrating example techniques used by the thresholds and metrics device for calculating an MRD in accordance with certain embodiments of this disclosure.

Turning now to FIG. 3, an example schematic block diagram 300 is depicted illustrating example techniques used by the thresholds and metrics device 202 for calculating an MRD 220 data in accordance with certain embodiments of this disclosure. As illustrated thresholds and metrics device 202 can receive as inputs monitoring system data 304 (e.g., from monitoring system 204), threshold store data 306 (e.g., from threshold store 206), policy/scenario data 308 (e.g., from policy/scenario store 208), and any other suitable data.

Figure 4A:
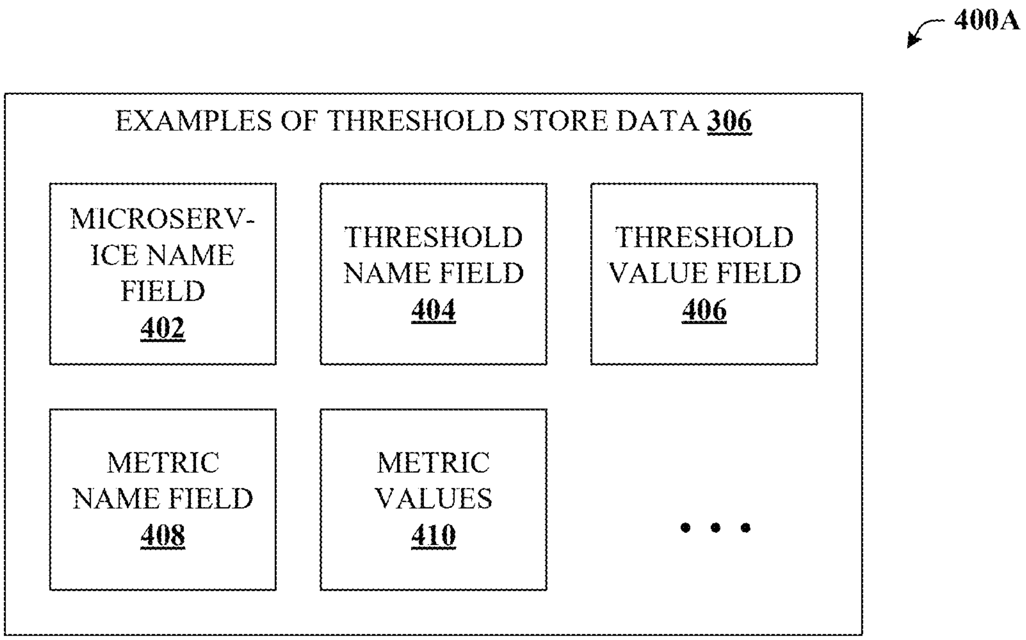
FIG. 4A depicts a schematic block diagram illustrating various examples of certain threshold store data in accordance with certain embodiments of this disclosure.

Monitoring system data 304 can be indicative of actual metrics collected during runtime for microservices platform 106. Various examples of certain threshold store data 306 is depicted in connection with FIG. 4A in accordance with certain embodiments of this disclosure. For example, in the case of threshold 310 data, threshold store data 306 can store or provide threshold 310 data in the form of quadruples. Each quadruple can include a microservice name field 402 that can identify a target microservice (e.g., microservice 108A as opposed to microservice 108B), a threshold name field 404 that can identify a target threshold (e.g., threshold 310A1 as opposed to threshold 310A2 or thresholds associated with microservice 108B) applicable to the target microservice, a threshold value field 406 that can be indicative of threshold value associated with the target threshold 310, and a metric name field 408 that can identify one or more target metric 312 that is associated with that particular target threshold 310.

Likewise, in the case of metric data 312, threshold data store 306 can store or provide threshold 310 data in the form of a quintuple. Each quintuple can include the quadruple for a given threshold 310 along with metric values 410 that can be obtain for that particular microservice 108 during operation.

Figure 4B:
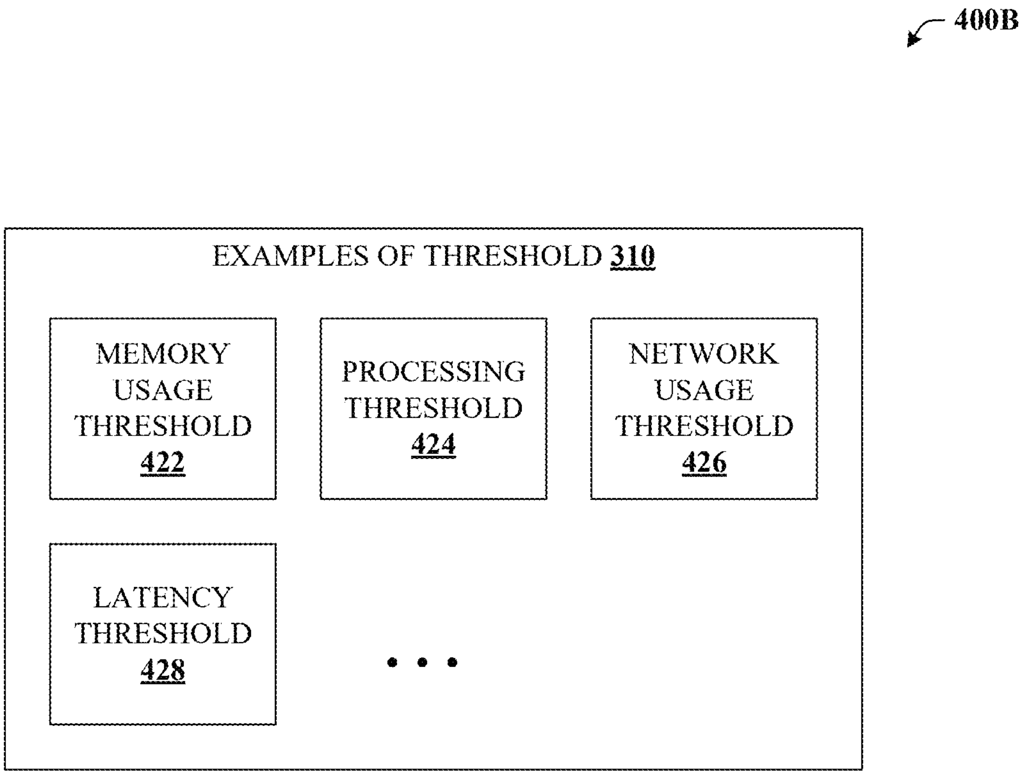
FIG. 4B depicts a schematic block diagram illustrating various examples of performance thresholds in accordance with certain embodiments of this disclosure.

In response to receiving or retrieving data elements 304-308, thresholds and metrics device 202 can determine an MRD 220 for each microservice 108. For example, the techniques shown and described in connection with microservice 108A can be performed as well with microservice 108B. In that regard, and as detailed above with respect to FIG. 2, thresholds and metrics device 202 can identify all or a portion of thresholds 310 (also referred to herein as performance thresholds 310). As shown, a given microservice 108A may have multiple different thresholds 310, various examples of which are depicted in connection with FIG. 4B in accordance with certain embodiments of this disclosure.

It is to be appreciated that any suitable threshold 310 can be tracked and further that a given threshold 310 can be paired with a given runtime metric 312. Such can include commonly used thresholds 310 such as memory usage threshold 422, processing threshold 424, network usage threshold 426, as well as custom or uncommon thresholds such as a latency threshold 428 and so on.

Still referring to FIG. 3, in the illustrated example, thresholds and metrics device 202 retrieves, for each microservice 108, one or more thresholds 310 (e.g., CPU threshold, memory threshold, network throughput threshold) and the associated runtime metrics 312 collected over a defined time window (e.g., the past day, week, month, . . . ).

In response, for example based on a time-series of metric 312 values (e.g., memory usage samples) for each threshold 310, thresholds and metrics device 202 can compute average value an average value 314 for that metric 312. Formally, if the metric data points for a given threshold are $m_1$, $m_2$, . . . , $m_n$, the average value 314, AV, can be:

$$AV = \frac{\sum_{i=1}^{n} m_i}{n}.$$

Once the average value 314 is determined for a given metric 312, thresholds and metrics device 202 can determine deviation 316. With the threshold 310 denoted by T (e.g., a memory threshold of 512 MB) and the average value 314 denoted by AV (e.g., average memory usage of 490 MB), the thresholds and metrics device 202 can then compute the deviation 316, D, of this average value 314 from the threshold 310. One way to represent this deviation 316 is:

$$D(i) = \frac{AV(i)}{T(i)},$$

Where D(i) is the relative deviation for the i-th threshold 310 of the microservice 108, AV(i) is the average usage, and T(i) is the threshold value. It is observed that if D(i) is less than 1, then the average usage is below the threshold. However, values close to 1 can indicate that average usage is very close to the threshold, or in some cases above the threshold (e.g., when D(i) is greater than 1), indicating a potential violation of threshold 310.

It is noted that many microservices 108 will have multiple thresholds 310 (e.g., CPU threshold, memory threshold, network threshold). The thresholds and metrics device 202 can calculate a deviation value 316, D(i), for each threshold 310 and for each microservice 108. thresholds and metrics device 202 can then find the maximum of these deviation values 314 for a particular microservice 108, which becomes the MRD 220. Such can be based on the following:

$$MRD = \max_{i \in \{thresholds\}} D(i).$$

This MRD 220 can reflect the dimension (CPU, memory, network, etc.) in which the microservice 108 is "closest" to hitting or exceeding its threshold and thus most at risk. Hence, by computing and comparing the MRD 220 across the entire set of microservices 108, the thresholds and metrics device 202 can pinpoint the ones operating closest to (or exceeding) their performance thresholds 310. This can allow an efficient selection of microservices 108 and corresponding Chaos testing scenarios, thereby minimizing overall resource consumption while maximizing resiliency improvements. Further, thresholds and metrics device 202 can provide the MRD 220 (e.g., one per microservice 108) to downstream components (e.g., a microservices selector) that use this information to prioritize Chaos testing on microservices with the highest MRD values, which is further detailed in connection with FIG. 6.

Figure 5:
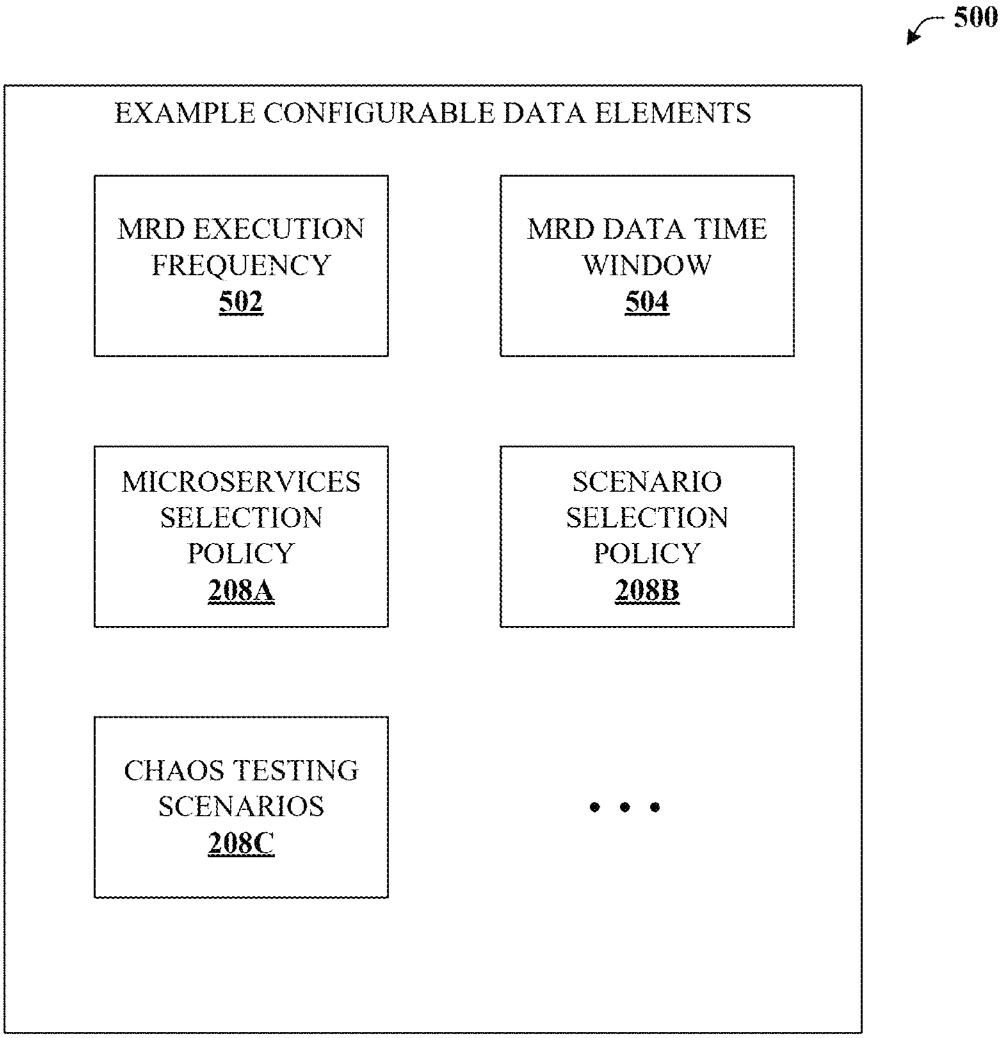
FIG. 5 depicts a schematic block diagram illustrating various example configurable data elements that can be adjusted to improve chaos testing processes in accordance with certain embodiments of this disclosure.

It is appreciated that multiple facets of operation relating to thresholds and metrics device 202 can relate to configurable parameters that can set by a system operator or another suitable entity and can be tailored to various different implantations or use cases. For example, FIG. 5 depicts a schematic block diagram 500 illustrating various example configurable data elements that can be adjusted to improve chaos testing processes in accordance with certain embodiments of this disclosure.

In that regard, an MRD execution frequency 502 can be configured, which can specify how often the MRD 220 is to be calculated and/or how often associated runtime metric 312 data is obtained from monitoring system 204. MRD data time window 504 can relate to how much data is retrieved from monitoring system 204 such as runtime metric data going back X number of days, weeks, or the like. Furthermore, as detailed previously, microservices selection policy 208A (e.g., select X number or Y percent of highest MRD microservices) scenarios selection policy 208B (e.g., use or do not use testing scenarios that test certain metrics as a function of MRD 220), and chaos testing scenarios 208C (e.g., indicating certain testing cases) can all be configurable.

Figure 6:
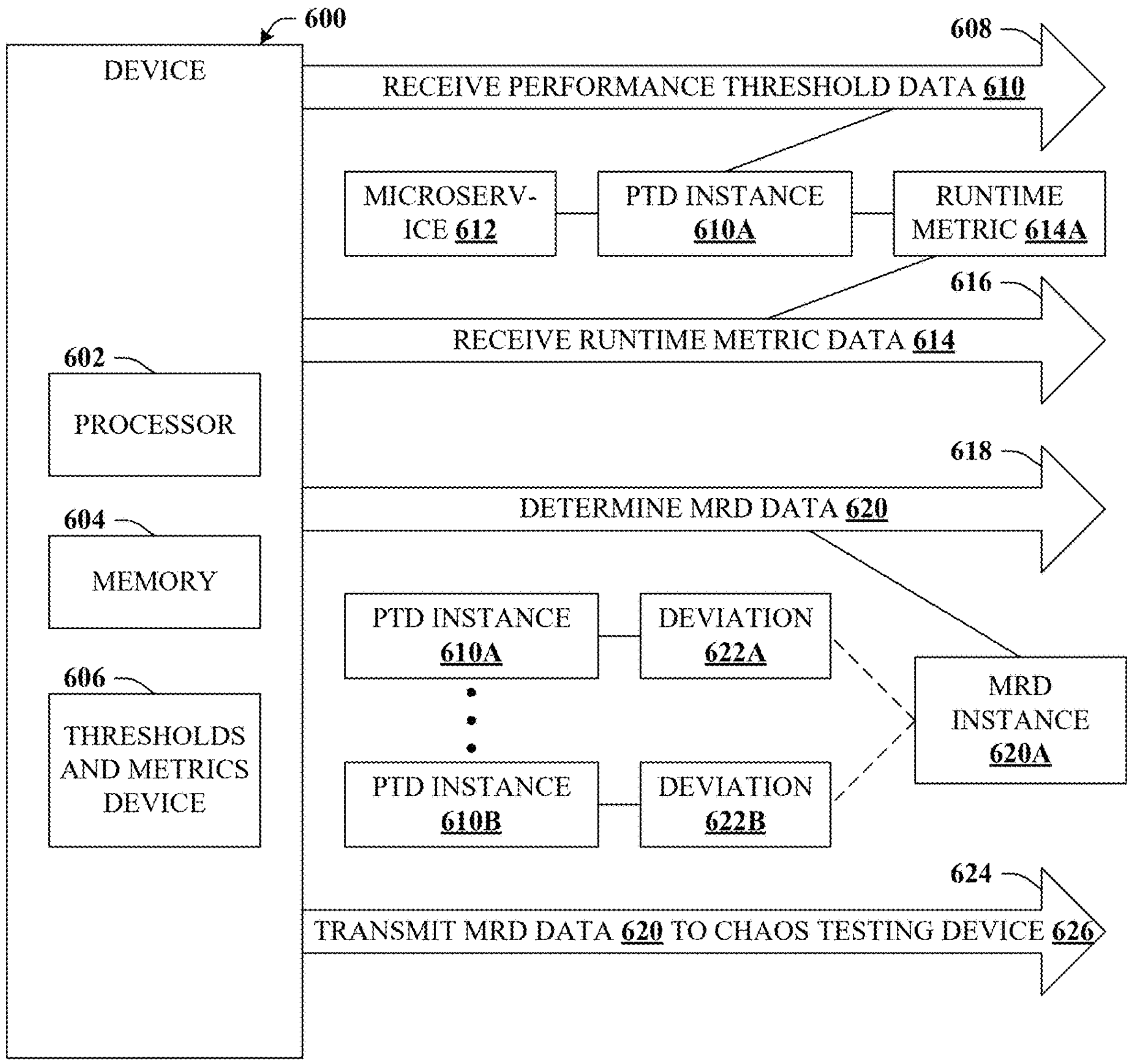
FIG. 6 depicts a schematic block diagram illustrating an example device that can determine an MRD factor for microservices of a microservices platform to be used with chaos testing prioritization in accordance with certain embodiments of this disclosure.

With reference now to FIG. 6, a schematic block diagram illustrating an example device 600 that can determine an MRD factor for microservices of a microservices platform to be used with chaos testing prioritization in accordance with certain embodiments of this disclosure. In some embodiments, device 600 can be included in or communicatively coupled to a microservices platform such as microservices platform 106. In some embodiments, device 600 can include all or a portion of the elements detailed in connection with FIGS. 2 and 3. For example, in the illustrated embodiment, device 600 comprises thresholds and metrics device 606, which can be substantially similar to thresholds and metrics device 202.

Device 600 can comprise a processor 602 that, potentially along with thresholds and metrics device 606, can be specifically configured to perform functions associated with determining a vulnerability of a microservice (or other executable instruction unit) of a microservices platform (or other software system platform). This vulnerability can relate to a likelihood of exceeding certain performance thresholds in operation. Device 600 can also comprise memory 604 that stores executable instructions that, when executed by processor 602, can facilitate performance of operations. Processor 602 can be a hardware processor having structural elements known to exist in connection with processing units or circuits, with various operations of processor 602 being represented by functional elements shown in the drawings herein that can require special-purpose instructions, for example, stored in memory 604 and/or thresholds and metrics device 606. Along with these special-purpose instructions, processor 602 and/or thresholds and metrics device 606 can be a special-purpose device. Further examples of the memory 604 and processor 602 can be found with reference to FIG. 11. It is to be appreciated that device 600 or computer 1102 can represent a server device or a client device of a network or data services platform and computer 1102 can be used in connection with implementing one or more of the systems, devices, or components shown and described in connection with FIG. 6 and other figures disclosed herein.

At reference numeral 608, device 600 can receive performance threshold data 610 (e.g., threshold store data 306). Performance threshold data (PTD) 610 can include a different PTD instance 610A (e.g., threshold 310) for each performance threshold associated with a given microservice 612 (e.g., microservice 108). Further, each PTD 610 can be associated with one or more specific runtime metric 614A (e.g., metric 312, potentially formatted as a quadruple).

At reference numeral 616, device 600 can receive runtime metric data 614 (e.g., potentially formatted as a quintuple, of which runtime metric 614A is one example).

At reference numeral 618, device 600 can determine MRD data 610 for one or more microservices 612. For example, each microservice 612 can comprise multiple PTD instances 610, shown here as PTD instances 610A and PTD instance 610B. For each PTD instance 610, device 600 can determine an associated deviation 622, shown here as deviation 622A and deviation 622B. From among all PTD instances 610 associated with a given microservice 612, the one with the highest deviation 622 can be selected as an MRD 620 for that particular microservice, illustrated here as MRD instance 620A, which is a portion of MRD data 620 for all microservices 612. Thus, MRD instance 620A represents, on a per microservice 612 basis, the particular PTD instance 610 and runtime metric 614 pair that is most likely to exhibit a threshold violation during operation of the particular microservice 612.

At reference numeral 624, device 600 can transmit MRD data 620 to chaos testing device 626. MRD data 620 can be usable by chaos testing device 626 to cause random or systematic failures in a microservices platform in order to test selected the selected microservice(s) 612 identified by MRD data 620.

Figure 7:
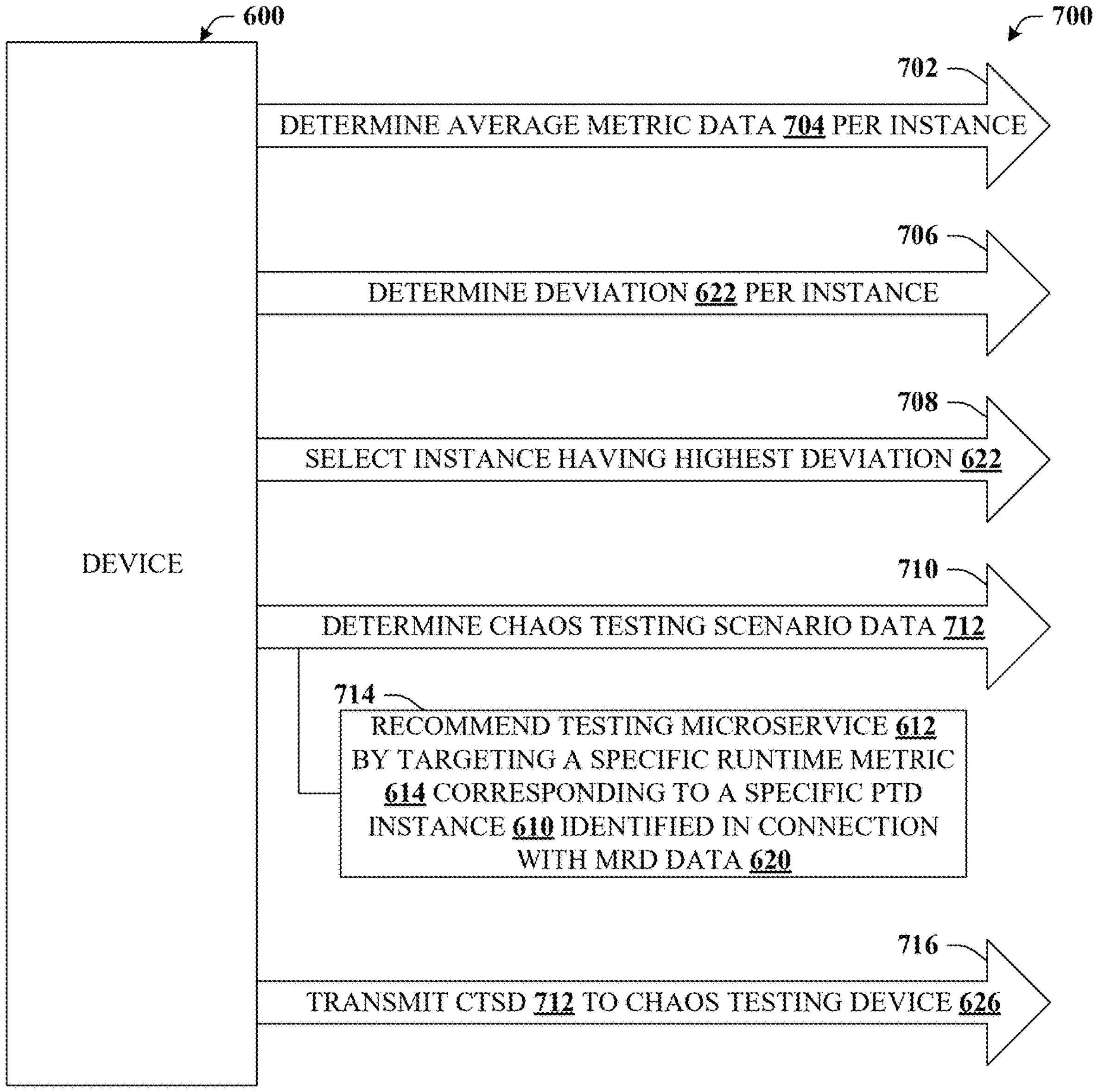
FIG. 7 depicts a schematic block diagram illustrating the example device that can provide additional functionality or elements relating to determining an MRD factor and recommending appropriate chaos testing scenarios in accordance with certain embodiments of this disclosure.

Turning now to FIG. 7, depicted is a schematic block diagram 700 illustrating the example device 600 that can provide additional aspects or elements relating to determining an MRD factor and recommending appropriate chaos testing scenarios in accordance with certain embodiments of this disclosure.

For example, at reference numeral 702, device 600 can determine average metric data 704 per instance of a given performance threshold-runtime metric pair. For example, based on the runtime metric data that is examined during runtime operations, an average level of operation can be determined, which can reflect average metric data 704.

At reference numeral 706, device 600 can determine deviation 622 on a per instance basis. Deviation 622 can represent the deviation between the average level of operation and the defined threshold (e.g., PTD instance 610). In other words, deviation 622 can reflect the difference or distance between the average level of operation and the threshold. When that difference is small (e.g., deviation approaching 1 in some embodiments) then such indicates that the operation of that particular microservice with regard to that particular metric is very close to the associated threshold value.

Hence, at reference numeral 708, device 600 can select the instance having the highest deviation 622. For example, from among all the pairs of runtime metrics and associated thresholds for a given microservice, the one with the highest deviation 622 can be selected as the MRD instance 620 for that particular microservice.

At reference numeral 710, device 600 can determine chaos testing scenario data 712. As indicated at reference numeral 714, chaos testing scenario data can relate to recommending testing microservice 612 by targeting a specific runtime metric 614 corresponding to a specified PTD instance 610 identified in connection with MRD data 620. In other words, if the PTD instance 610 relates to memory usage as opposed to network throughput, then the associated recommendation can recommend to the chaos testing device to test that particular microservice with regard to memory usage test. Potentially, the recommendation might also indicate that network throughput type tests can be excluded, e.g., when the associated average value was determined to be very low and/or distant from the associated threshold.

At reference numeral 716, device 600 can transmit chaos testing scenarios data 712 (e.g., determined at reference numeral 710) to chaos testing device 626. Hence, in addition to MRD data 620 that was transmitted in connection with reference numeral 624 of FIG. 6, device 600 can also transmit chaos testing scenarios data 712. Thus, while MRD data 620 can represent recommendations for which particular microservices 612 should be tested, chaos testing scenarios data 712 can represent recommendations for how to test those particular microservices 612, either or both of which can help optimize, improve, or prioritize the resources allocated to chaos testing.

Example Methods

Figure 8:
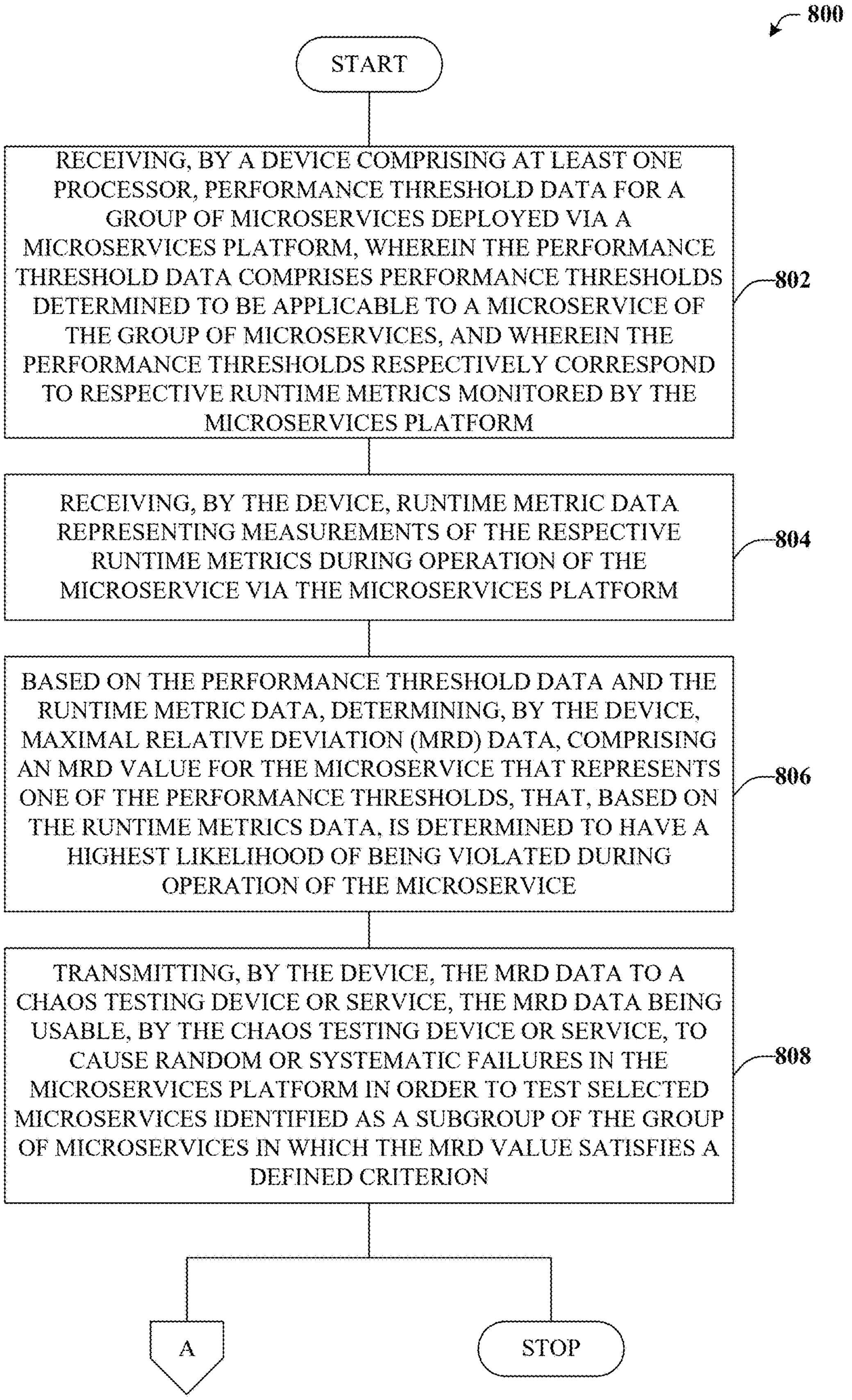
FIG. 8 illustrates an example method that can determine an MRD factor for microservices of a microservices platform to be used with chaos testing prioritization in accordance with certain embodiments of this disclosure.
Figure 9:
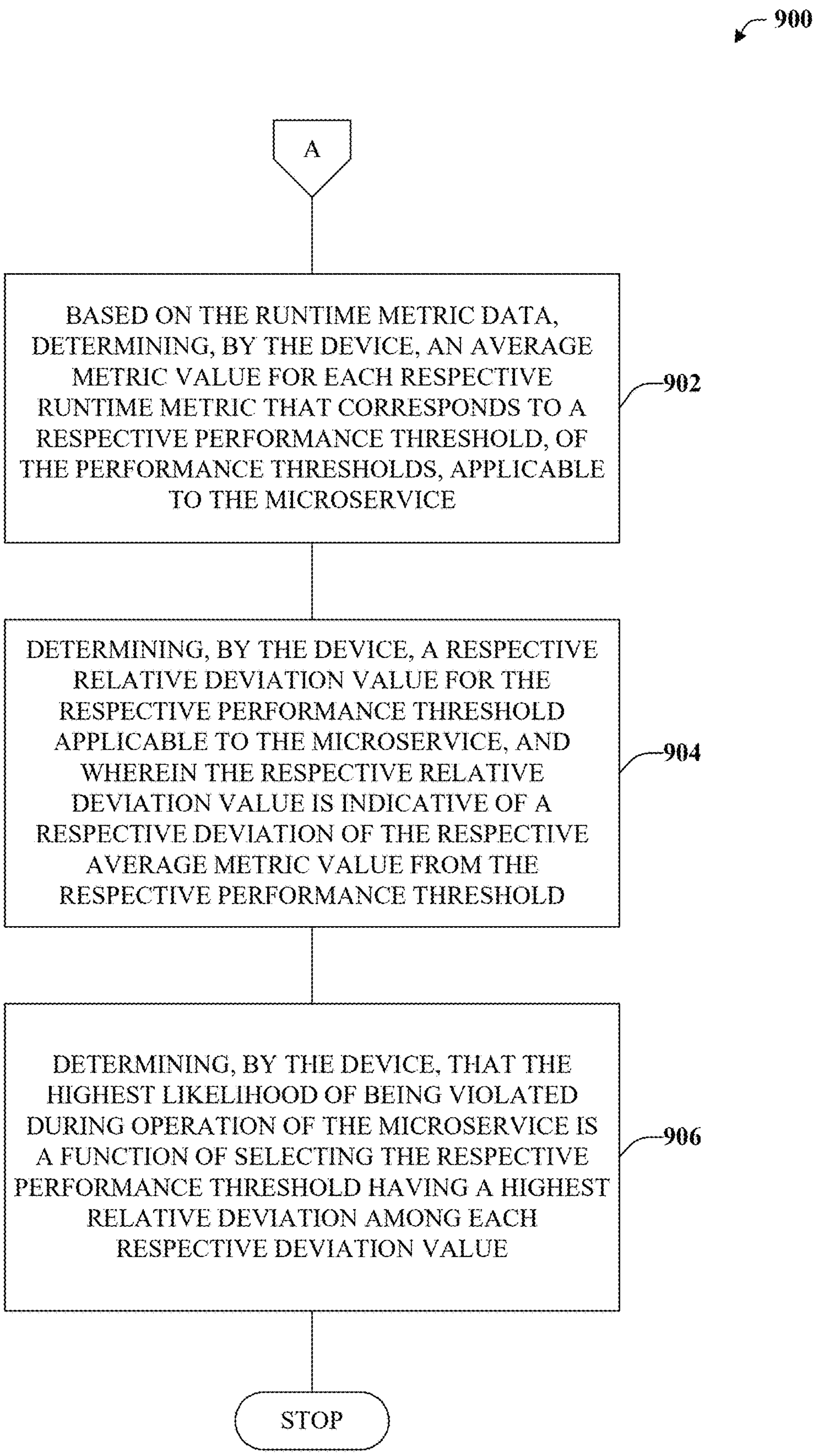
FIG. 9 illustrates an example method that can provide for additional functionality or elements relating to determining the MRD factor for microservices of a microservices platform to be used with chaos testing prioritization in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 8, exemplary method 800 is depicted. Method 800 can determine an MRD factor for microservices of a microservices platform to be used with chaos testing prioritization in accordance with certain embodiments of this disclosure. While method 800 describes a complete method, in some embodiments, method 800 can include one or more elements of method 900, reached via insert A, as discussed at FIG. 9.

At reference numeral 802, a device comprising at least one processor can receive performance threshold data for a group of microservices deployed via a microservices platform. The performance threshold data can comprise performance thresholds determined to be applicable to a microservice of the group of microservices. For example, the performance thresholds can respectively correspond to respective runtime metrics monitored by the microservices platform.

In that regard, the performance threshold data can include one or more performance thresholds applicable to each microservice (e.g., CPU usage, memory usage, network throughput, response time). Each performance threshold can correspond to a runtime metric (e.g., memory utilization percentage, average response latency) that is monitored by the microservices platform. For example, the device may retrieve these thresholds from a central configuration database or a threshold management service that maintains performance requirements (e.g., 80% CPU usage, 512 MB memory usage) for each microservice.

At reference numeral 804, the device can receive runtime metric data. The runtime metric data can represent measurements of the respective runtime metrics during operation of the microservice via the microservices platform. Hence, runtime metric data can reflect measurements taken from the microservices platform during normal operations. This metric data can correspond to the same runtime metrics (e.g., CPU usage, memory usage, latency, etc.) specified in the performance thresholds received at reference numeral 802. For example, The device may connect to a monitoring system (e.g., Prometheus, New Relic) to retrieve time-series data that shows recent CPU usage percentages or memory consumption.

At reference numeral 806, based at least on the performance threshold data and the runtime metric data, the device can determine maximal relative deviation (MRD) data.

MRD data can comprise an MRD value for the microservice that represents one of the performance thresholds, that, based on the runtime metrics data, is determined to have a highest likelihood of being violated during operation of the microservice. It is appreciated that The MRD for a given microservice can be the highest ratio of the average (or otherwise aggregated) runtime metric value to the corresponding threshold value among all thresholds applicable to that microservice.

For example, if a microservice has a CPU usage threshold of 80% and memory usage threshold of 512 MB, and the observed average CPU usage is 72% while average memory usage is 490 MB, the device calculates two relative deviations and can select the larger one as the MRD.

At reference numeral 808, the device can transmit the MRD data to a chaos testing device or service. This MRD data can be usable, by the chaos testing device or service, to cause random or systematic failures in the microservices platform in order to test selected microservices identified as a subgroup of the group of microservices in which the MRD value satisfies a defined criterion.

Thus, MRD data identifies, for each microservice, the threshold dimension (e.g., CPU, memory, network) that is most at risk of being violated and the magnitude of that risk (i.e., the MRD value). For example, The chaos testing device or service can leverage the MRD data to select microservices (or a subgroup of the microservices) that meet a defined MRD criterion (for example, MRD>0.9). The service then injects random or systematic failures (e.g., killing instances, throttling traffic) in those at-risk microservices to evaluate their resilience under stress conditions. Method 800 can terminate in some embodiments, or proceed to insert A in other embodiments, which is further detailed in connection with FIG. 9.

Turning now to FIG. 9, exemplary method 900 is depicted. Method 900 can provide for additional functionality or elements relating to determining the MRD factor for microservices of a microservices platform to be used with chaos testing prioritization in accordance with certain embodiments of this disclosure.

For example, at reference numeral 902, based on the runtime metric data, the device introduced in FIG. 9 can further determine an average metric value for each respective runtime metric that corresponds to a respective performance threshold, of the performance thresholds, applicable to the microservice.

A reference numeral 904, the device can determine a respective relative deviation value for the respective performance threshold applicable to the microservice. The respective relative deviation value can be indicative of a respective deviation of the respective average metric value from the respective performance threshold.

At reference numeral 906, the device can determine that the highest likelihood of being violated during operation of the microservice is a function of selecting the respective performance threshold having a highest relative deviation among each respective deviation value.

Example Operating Environments

Figure 10:
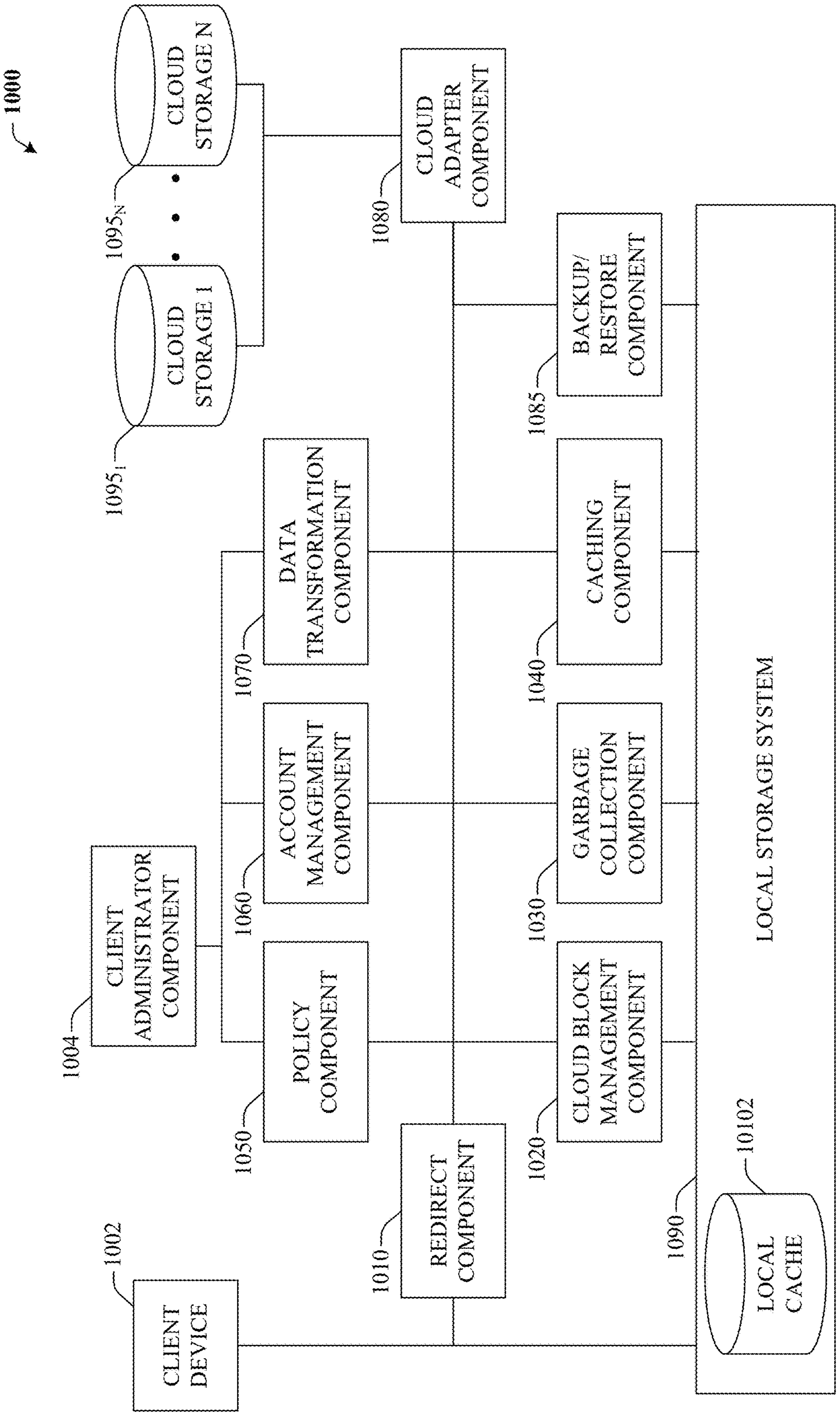
FIG. 10 illustrates a block diagram of an example distributed file storage system that employs tiered cloud storage in accordance with certain embodiments of this disclosure.
Figure 11:
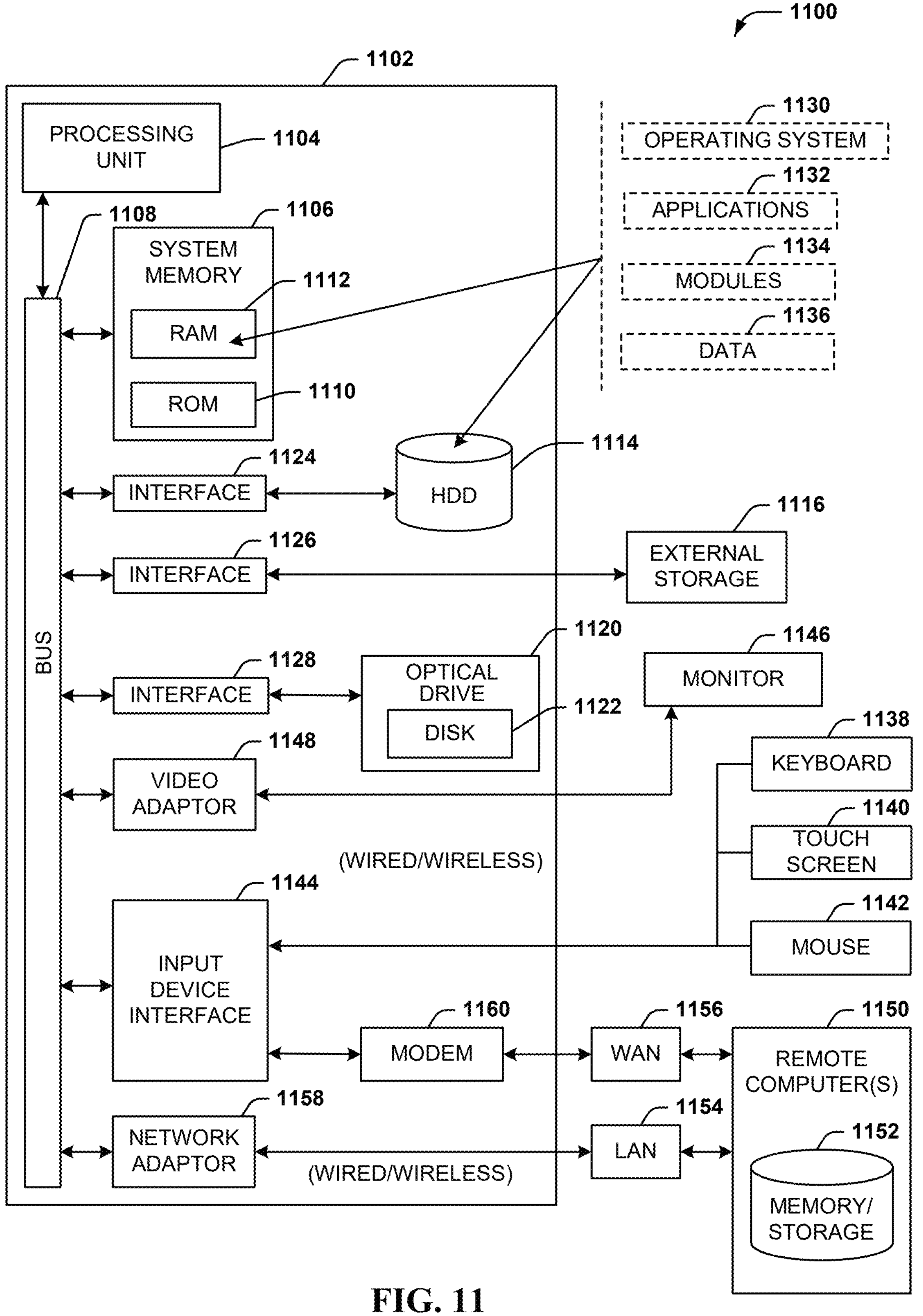
FIG. 11 illustrates an example block diagram of a computer operable to execute certain embodiments of this disclosure.

To provide further context for various example embodiments of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with example embodiments described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $\mathbf{1095}_1$ and cloud storage N $\mathbf{1095}_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on a list of mappings that the cloud block management component 1020 manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that the file has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time the stub file is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can request or require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various example embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as “data store,” data storage,” “database,” “cache,” and substantially any other information storage component relevant to operation and functionality of a component, refer to “memory components,” or entities embodied in a “memory” or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms “component,” “module,” “system,” “interface,” “cluster,” “server,” “node,” or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word “example” or “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A device, comprising:

at least one processor; and at least one memory that stores executable instructions that, when executed by the at least one processor, facilitate performance of operations, comprising:

receiving performance threshold data for a group of microservices deployed via a microservices platform, wherein the performance threshold data comprises performance thresholds determined to be applicable to a first microservice of the group of microservices, and wherein the performance thresholds respectively correspond to respective runtime metrics monitored by the microservices platform;

receiving runtime metric data representing measurements of the respective runtime metrics during operation of the first microservice via the microservices platform;

based on the performance threshold data and the runtime metric data, determining maximal relative deviation (MRD) data, comprising an MRD value for the first microservice that represents one of the performance thresholds, wherein the MRD data, based on the runtime metric data, is determined to have a highest likelihood of being violated during operation of the first microservice;

determining a chaos testing scenario recommendation for a chaos testing device or service, wherein the chaos testing scenario recommendation recommends testing the first microservice by targeting a specific runtime metric that corresponds to a specific performance threshold, of the performance threshold, identified in connection with the MRD value, and wherein the chaos testing scenario recommendation excludes, from a recommendation to the chaos testing device or service, any scenario for testing the first microservice that tests a different runtime metric corresponding to a different performance threshold not associated with the MRD value or that has a relative deviation value that is below a defined threshold; and after transmitting the MRD data and the chaos testing scenario recommendation to the chaos testing device or service, performing testing using the MRD data and the chaos testing scenario recommendation, the testing being performed, via the chaos testing device or service, to cause random or systematic failures in the first microservices platform in order to test selected microservices identified as a subgroup of the group of microservices in which the MRD value satisfies a defined criterion.

2. The device of claim 1, wherein the performance thresholds represent performance or operational limits set by a system operator of the microservices platform or derived from a specification of the microservices platform.

3. The device of claim 2, wherein the performance thresholds comprise at least one of a memory usage threshold, a processing threshold, a network usage threshold, or a latency threshold for a given operation.

4. The device of claim 1, wherein the performance threshold data comprises a microservice name field that identifies a target microservice of the microservices, a threshold name field that identifies a target threshold applicable to the target microservice, a threshold value field indicative of a threshold value associated with the target threshold, and a metric name field that identifies a target metric, of the respective runtime metrics.

5. The device of claim 1, wherein the operations further comprise, based on the performance threshold data and the runtime metric data, generating combined data comprising a microservice name field that identifies a target microservice of the microservices, a threshold name field that identifies a target threshold applicable to the target microservice, a threshold value field indicative of a threshold value associated with the target threshold, a metric name field that identifies a target metric, of the respective runtime metrics, and target metric data indicative measurements of the target metric during operation of the target microservice.

6. The device of claim 1, wherein the operations further comprise, based on the runtime metric data, determining an average metric value for each respective runtime metric of the respective runtime metrics that corresponds to a respective performance threshold, of the performance thresholds, applicable to the first microservice.

7. The device of claim 6, wherein the operations further comprise determining a respective relative deviation value for the respective performance threshold applicable to the first microservice, and wherein the respective relative deviation value is indicative of a respective deviation of the respective average metric value from the respective performance threshold.

8. The device of claim 7, wherein the MRD value for the first microservice is determined by selecting the respective performance threshold having a highest relative deviation among each respective deviation value.

9. A device, comprising:

at least one processor; and at least one memory that stores executable instructions that, when executed by the at least one processor, facilitate performance of operations, comprising:

receiving performance threshold data for a first group of microservices deployed on a microservices platform, wherein the performance threshold data comprises performance thresholds determined to be applicable to a first microservice of the first group of microservices, and wherein the performance thresholds respectively correspond to respective runtime metrics monitored by the microservices platform;

receiving runtime metric data representing measurements of the respective runtime metric during operation of the first microservice on the microservices platform;

based on the performance threshold data and the runtime metric data, determining a respective average metric value for each respective runtime metric of the respective runtime metrics that corresponds to a respective performance threshold, of the performance thresholds, applicable to the first microservice;

determining a respective relative deviation value for the respective performance threshold applicable to the first microservice, and wherein the respective relative deviation value is indicative of a respective deviation of the respective average metric value from the respective performance threshold;

as a function of the respective average metric value and the respective relative deviation value, determining greatest relative deviation (MRD) data, comprising an MRD value for the first microservice that represents one of the performance thresholds, that, based on the runtime metrics data, is determined to have at least a threshold limit on likelihood of being violated during operation of the first microservice;

determining a chaos testing scenario recommendation for a chaos testing device or service, and wherein the chaos testing scenario recommendation recommends testing the first microservice by targeting a specific runtime metric that corresponds to a specific performance threshold, of the performance threshold, identified in connection with the MRD value, wherein the chaos testing scenario recommendation excludes, from a recommendation to the chaos testing device or service, any scenario for testing the first microservice that tests a different runtime metric corresponding to a different performance threshold not associated with the MRD value or that has a relative deviation value that is below a defined threshold; and after transmitting the MRD data and the chaos testing scenario recommendation to the chaos testing device or service, the MRD data performing testing using the MRD data and the chaos testing scenario recommendation, the testing being performed, via the chaos testing device or service, to cause random or systematic failures in the microservices platform in order to test selected microservices identified by a second group of microservices indicative of a subgroup of the first group of microservices in which the MRD value satisfies a defined criterion.

10. The device of claim 9, wherein the operations further comprise iteratively determining respective other MRD values, other than the MRD value associated with the first microservice, and wherein the respective other MRD values correspond to other respective microservices deployed on the microservices platform other than the first microservice.

11. The device of claim 9, wherein the performance threshold data comprises a microservice name field that identifies a target microservice of the microservices, a threshold name field that identifies a target threshold applicable to the target microservice, a threshold value field indicative of threshold value associated with the target threshold, and a metric name field that identifies a target metric, of the respective runtime metrics.

12. The device of claim 9, wherein the operations further comprise recalculating the MRD data according to at least one of: a configurable frequency parameter that indicates a frequency by which to recalculate the MRD data, a configurable selection policy that indicates a rule for selecting the first microservice for chaos testing as a function of the MRD data, or a configurable scenario selection policy that indicates a chaos testing scenario type as a function of the MRD data.

13. A method, comprising:

receiving, by a device comprising at least one processor, performance threshold data for a group of microservices deployed via a microservices platform, wherein the performance threshold data comprises performance thresholds determined to be applicable to a first microservice of the group of microservices, and wherein the performance thresholds respectively correspond to respective runtime metrics monitored by the microservices platform;

receiving, by the device, runtime metric data representing measurements of the respective runtime metrics during operation of the first microservice via the microservices platform;

based on the performance threshold data and the runtime metric data, determining, by the device, maximal relative deviation (MRD) data, comprising an MRD value for the first microservice that represents one of the performance thresholds, that, based on the runtime metrics data, is determined to have a highest likelihood of being violated during operation of the first microservice;

determining a chaos testing scenario recommendation for a chaos testing device or service, and wherein the chaos testing scenario recommendation recommends testing the first microservice by targeting a specific runtime metric that corresponds to a specific performance threshold, of the performance threshold, identified in connection with the MRD value, wherein the chaos testing scenario recommendation excludes, from a recommendation to the chaos testing device or service, any scenario for testing the first microservice that tests a different runtime metric corresponding to a different performance threshold not associated with the MRD value or that has a relative deviation value that is below a defined threshold; and after transmitting, by the device, the MRD data and the chaos testing scenario recommendation to the chaos testing device or service, performing testing using the MRD data and the chaos testing scenario recommendation, the testing being performed, via the chaos testing device or service, to cause random or systematic failures in the microservices platform in order to test selected microservices identified as a subgroup of the group of microservices in which the MRD value satisfies a defined criterion.

14. The method of claim 13, further comprising, based on the runtime metric data, determining, by the device, an average metric value for each respective runtime metric that corresponds to a respective performance threshold, of the performance thresholds, applicable to the first microservice.

15. The method of claim 14, further comprising determining, by the device, a respective relative deviation value for the respective performance threshold applicable to the first microservice, and wherein the respective relative deviation value is indicative of a respective deviation of the respective average metric value from the respective performance threshold.

16. The method of claim 15, further comprising determining, by the device, that the highest likelihood of being violated during operation of the first microservice is a function of selecting the respective performance threshold having a highest relative deviation among each respective deviation value.

17. The method of claim 13, wherein the performance thresholds represent performance or operational limits set by a system operator of the microservices platform.

18. The method of claim 13, wherein the performance thresholds represent performance or operational limits derived from a specification of the microservices platform.

19. The method of claim 18, wherein the performance thresholds comprise at least one of a memory usage threshold, a processing threshold, a network usage threshold, or a latency threshold for a given operation.

20. The method of claim 13, wherein the performance threshold data comprises a microservice name field that identifies a target microservice of the microservices, a threshold name field that identifies a target threshold applicable to the target microservice, a threshold value field indicative of a threshold value associated with the target threshold, and a metric name field that identifies a target metric, of the respective runtime metrics.

* * * * *